United States Patent
Xie (10) Patent No.: US 11,733,955 B2
(45) Date of Patent: Aug. 22, 2023

(54) SPLIT-SCREEN DISPLAY METHOD, ELECTRONIC DEVICE, AND COMPUTER-READABLE MEDIUM

(71) Applicant: BOE Technology Group Co., Ltd., Beijing (CN)

(72) Inventor: Yingkai Xie, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/512,561

(22) Filed: Oct. 27, 2021

(65) Prior Publication Data
US 2022/0137911 A1 May 5, 2022

(30) Foreign Application Priority Data
Oct. 29, 2020 (CN) .......................... 202011178031.8

(51) Int. Cl.
G06F 3/14 (2006.01)
G06F 3/0482 (2013.01)

(52) U.S. Cl.
CPC .......... *G06F 3/1446* (2013.01); *G06F 3/0482* (2013.01); *G06F 2203/04803* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0113934 A1* | 6/2004 | Kleinman | ........... | G06F 16/4393 715/732 |
| 2011/0202957 A1* | 8/2011 | Cho | ................... | H04M 1/72415 725/38 |
| 2014/0365957 A1* | 12/2014 | Louch | ................... | G06F 3/1423 715/790 |
| 2015/0113411 A1* | 4/2015 | Underwood | .......... | G06F 3/1423 715/730 |
| 2015/0169205 A1* | 6/2015 | Yajima | ................ | G06F 3/04847 715/799 |
| 2016/0328204 A1* | 11/2016 | Sridhar | ................. | G06F 40/169 |
| 2017/0286047 A1* | 10/2017 | Patil | ................. | H04N 21/43615 |
| 2017/0351396 A1* | 12/2017 | Passeri | ................ | G06F 3/03543 |
| 2019/0339836 A1* | 11/2019 | Kanda | ................. | G06F 3/04886 |

* cited by examiner

*Primary Examiner* — William Boddie
*Assistant Examiner* — Alecia D English
(74) *Attorney, Agent, or Firm* — IPro, PLLC (57) ABSTRACT

Provided is to a split-screen display method, including: determining at least one association display screen associated with a main operation display screen; determining, in response to a split-screen operation acting on the main operation display screen, a target association display screen corresponding to the split-screen operation from the association display screen and acquiring page parameters of a to-be-displayed page in the main operation display screen; and transmitting the page parameters of the to-be-displayed page to the target association display screen.

18 Claims, 5 Drawing Sheets

| | |
|---|---|
| Acquiring the size information of the to-be-displayed page from the page parameters of the to-be-displayed page, and judging whether display size information of the target association display screen matches the size information of the to-be-displayed page | S610 |
| Acquiring, in the case that the display size information of the target association display screen matches the size information of the to-be-displayed page, the target page parameter based on the page parameters of the to-be-displayed page | S620 |
| Performing, in the case that the display size information of the target association display screen does not match the size information of the to-be-displayed page, the size conversion on the size information of the to-be-displayed page based on the display size information of the target association display screen, and obtaining the target page parameter based on converted size information of the to-be-displayed page | S630 |

FIG. 10

SPLIT-SCREEN DISPLAY METHOD, ELECTRONIC DEVICE, AND COMPUTER-READABLE MEDIUM

CROSS-REFERENCE TO RELATED APPLICATION

This application is based on and claims priority to the Chinese patent application No. 202011178031.8, filed on Oct. 29, 2020 and entitled "SPLIT-SCREEN DISPLAY METHOD AND APPARATUS. ELECTRONIC DEVICE, AND COMPUTER-READABLE MEDIUM," the disclosure of which is incorporated herein by reference in its entirety.

TECHNICAL FIELD

The present disclosure relates to the field of computer technologies, and particularly relates to a split-screen display method, an electronic device, and a computer-readable medium.

BACKGROUND

For hospitals, laboratories, or other places where a lot of information and data needs to be processed, a plurality of display screens may be provided in specific regions for displaying the data information, and each display screen generally operates independently of each other in most of the time.

SUMMARY

The present disclosure provides a split-screen display method. The method includes:

determining at least one association display screen associated with a main operation display screen;

determining, in response to a split-screen operation acting on the main operation display screen, a target association display screen corresponding to the split-screen operation from the association display screen and acquiring page parameters of a to-be-displayed page in the main operation display screen; and transmitting the page parameters of the to-be-displayed page to the target association display screen.

In an exemplary embodiment of the present disclosure, determining at least one association display screen associated with the main operation display screen includes:

acquiring connectable display screens of the main operation display screen, and transmitting information of all the connectable display screens to the main operation display screen; and determining, in response to a selection operation on the main operation display screen regarding the connectable display screens, the connectable display screen as selected as the association display screen.

In an exemplary embodiment of the present disclosure, acquiring the connectable display screens of the main operation display screen includes:

acquiring a region w % here the main operation display screen is disposed, and a region where other display screens, except the main operation display screen, are disposed; and taking the other display screens in a same region with the main operation display screen as the connectable display screens of the main operation display screen.

In an exemplary embodiment of the present disclosure, acquiring the connectable display screens of the main operation display screen includes:

acquiring distances between the main operation display screen and other display screens except the main operation display screen; and taking the other display screens whose distance from the main operation display screen is not greater than a distance threshold as the connectable display screens of the main operation display screen.

In an exemplary embodiment of the present disclosure, the split-screen operation includes a swiping split-screen operation; and determining, in response to the split-screen operation acting on the main operation display screen, the target association display screen corresponding to the split-screen operation from the association display screen includes:

acquiring, in response to the swiping split-screen operation acting on the main operation display screen, a swiping direction of the swiping split-screen operation; and determining an association display screen matching the swiping direction as the target association display screen.

In an exemplary embodiment of the present disclosure, determining, in response to the split-screen operation acting on the main operation display screen, the target association display screen corresponding to the split-screen operation from the association display screen includes:

popping up, in response to the split-screen operation acting on the main operation display screen, a screen selection interface on the main operation display screen; and determining, in response to a screen selection operation acting on the screen selection interface, the association display screen corresponding to the screen selection operation as the target association display screen.

In an exemplary embodiment of the present disclosure, determining, in response to the split-screen operation acting on the main operation display screen, the target association display screen corresponding to the split-screen operation from the association display screen includes:

displaying, in response to the split-screen operation acting on the main operation display screen, a split-screen interface on the main operation display screen, wherein the split-screen interface includes a main screen window for displaying a list of pages to be displayed and a slave screen window for displaying a list of association display screens; and determining, in response to a dragging operation from a to-be-displayed page control to an association display screen control, an association display screen corresponding to the dragging operation as the target association display screen of the to-be-displayed page, wherein the to-be-displayed page control is a control of the to-be-displayed page in the list of pages to be displayed, and the association display screen control is a control of the association display screen in the list of association display screens.

In an exemplary embodiment of the present disclosure, the page parameters of the to-be-displayed page include data information displayed in the to-be-displayed page and size information of the to-be-displayed page.

In an exemplary embodiment of the present disclosure, transmitting the page parameters of the to-be-displayed page to the target association display screen includes:

acquiring display screen information of the target association display screen, and obtaining a target page parameter based on the page parameters of the to-be-displayed page and the display screen information of the target association display screen; and transmitting the target page parameter to the target association display screen to enable the target association display screen to display contents of the to-be-displayed page based on the target page parameter.

In an exemplary embodiment of the present disclosure, the display screen information of the target association display screen includes display size information of the target association display screen; and obtaining the target page parameter based on the page parameters of the to-be-displayed page and the display screen information of the target association display screen includes:

acquiring size information of the to-be-displayed page from the page parameters of the to-be-displayed page, and judging whether the display size information of the target association display screen matches the size information of the to-be-displayed page;

acquiring, in response to a match between the display size information of the target association display screen and the size information of the to-be-displayed page, the target page parameter based on the page parameters of the to-be-displayed page; and performing, in response to a mismatch between the display size information of the target association display screen and the size information of the to-be-displayed page, size conversion on the size information of the to-be-displayed page based on the display size information of the target association display screen, and obtaining the target page parameter based on converted size information of the to-be-displayed page.

In an exemplary embodiment of the present disclosure, transmitting the page parameters of the to-be-displayed page to the target association display screen includes:

acquiring a screen identification number of the target association display screen from display screen information of the target association display screen; and transmitting the page parameters of the to-be-displayed page to the target association display screen based on the screen identification number.

In an exemplary embodiment of the present disclosure, wherein the main operation display screen includes a touch display screen.

In an exemplary embodiment of the present disclosure, after transmitting the page parameters of the to-be-displayed page to the target association display screen, the method further includes:

acquiring page display time of the to-be-displayed page from the page parameters of the to-be-displayed page to enable the target association display screen to display the contents of the to-be-displayed page based on the page display time.

In an exemplary embodiment of the present disclosure, the method further includes:

controlling, when the page display time of the to-be-displayed page on the target association display screen has expired, page content as displayed on the target association display screen to revert to an original page before display of the to-be-displayed page.

The present disclosure provides a split-screen display method, which is applied to a target association display screen and includes:

acquiring page parameters of a to-be-displayed page, and displaying contents of the to-be-displayed page based on the page parameters.

The present disclosure further provides a split-screen display method, which includes:

transmitting page parameters of a to-be-displayed page to a target association display screen by any one of the aforesaid methods; and displaying, via a target association display screen, contents of the to-be-displayed page based on the page parameters.

The present disclosure provides a split-screen display apparatus, which includes:

an association display screen determining subcircuit, configured to determine at least one association display screen associated with a main operation display screen;

a target display screen determining subcircuit, configured to determine, in response to a split-screen operation acting on the main operation display screen, a target association display screen corresponding to the split-screen operation from the association display screen and acquire page parameters of a to-be-displayed page in the main operation display screen; and a page parameter transmitting subcircuit, configured to transmit the page parameters of the to-be-displayed page to the target association display screen.

The present disclosure provides an electronic device, which includes, a processor, and a memory for storing at least one program, wherein the processor, when running the at least one program, is caused to perform any one of the aforesaid split-screen display methods.

The present disclosure provides a computer-readable medium storing computer programs therein, wherein the computer programs, when run by a processor, cause the processor to perform any one of the aforesaid split-screen display methods.

DETAILED DESCRIPTION

Exemplary embodiments are described more fully with reference to the accompanying drawings. However, the exemplary embodiments may be implemented in various forms, and shall not be limitedly understood as the examples set forth herein. On the contrary, provision of these embodiments may enable the present disclosure to be comprehensive and complete and thereby convey the concept of exemplary embodiments to those skilled in the art. The features, structures, or characteristics as described may be combined in any suitable manner in one or more embodiments. In the following description, many details are provided so as to give a full understanding of the embodiments of the present disclosure. However, those skilled in the art may realize that the technical solutions of the present disclosure may be practiced by omitting one or more of the particular details as described, or by employing other methods, groups of elements, devices, steps, and the like. In other cases, the well-known technical solutions will not be shown or described in detail to avoid distracting and thereby obscuring all aspects of the present disclosure.

In addition, the accompanying drawings are only schematic illustrations of the present disclosure and are not necessarily drawn to scale. Identical reference signs in the drawings indicate identical or similar portions, and thus their repetitive descriptions will be omitted. Some of the block diagrams shown in the accompanying drawings are functional entities and do not necessarily have to correspond to physically or logically separate entities. These functional entities may be implemented in software form, or in at least one hardware module or integrated circuit, or in different network and/or processor apparatuses and/or microcontroller apparatuses.

Under a case where a large amount of information and data is to be displayed, the single-screen display and operation may be limited by the size of the screen, and the pages may be switched repetitively to view the data, which usually has the phenomenon of inconvenient interaction.

In view of this, there is an urgent need in the art for a split-screen display method that can improve the efficiency of data display.

In the split-screen display method according to the exemplary embodiment of the present disclosure, at least one association display screen associated with the main operation display screen is determined, and pages to be displayed on the main operation display screen are transmitted to each association display screen for display, such that any interface can be expanded to any split-screen when the comparison or auxiliary display is required, and multi-dimensional data information can be simultaneously displayed on a plurality of display screens to improve the efficiency of data display and the ability of information transmission, thereby preventing the display region of data from being limited by a single display screen. By displaying multi-dimensional data information simultaneously on a plurality of display screens, users do not need to turn pages frequently on the same display screen when viewing and using data, thereby improving the user's efficiency in the data processing process.

Figure 1:
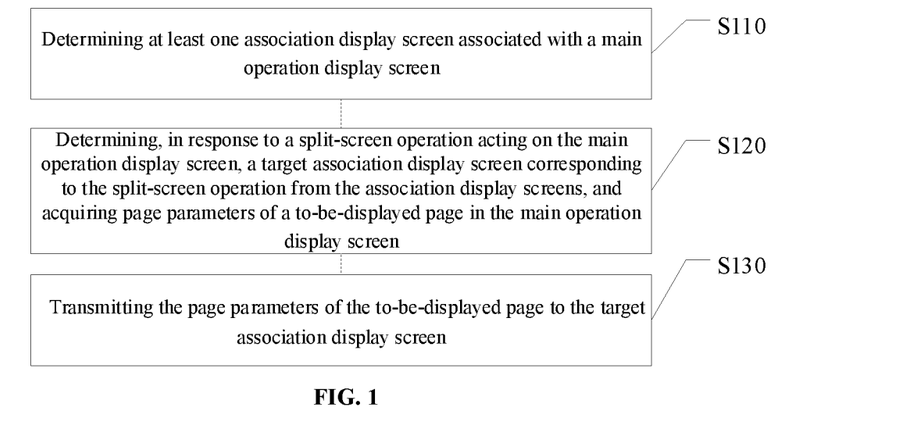
FIG. 1 shows a schematic flowchart of a split-screen display method according to some embodiments of the present disclosure.

This exemplary embodiment provides a split-screen display method. Referring to FIG. 1, the split-screen display method includes following steps.

In step S110, at least one association display screen associated with a main operation display screen is determined.

In step S120, in response to a split-screen operation acting on the main operation display screen, a target association display screen corresponding to the split-screen operation is determined from the association display screen, and page parameters of a to-be-displayed page in the main operation display screen are acquired.

In step S130, the page parameters of the to-be-displayed page are transmitted to the target association display screen to enable the target association display screen to display contents of the to-be-displayed page based on the page parameters.

For hospitals, laboratories, and other places where a lot of information and data needs to be processed, the single-screen display and operation often have inconvenience in interaction. Taking the hospitals as an example, with the development of medical technology and the progress in informatization of the hospital, especially the construction of various systems of intelligent wards, many display screens are provided in a specific region in the ward, or the display screens are provided in a plurality of specific regions of the ward with each having a specific purpose. During the use, the display screens generally operate independently of each other in most of the time. However, when the amount of information and data to be displayed is great, the plurality of pages may be displayed only on one screen, which may require switching the pages repetitively and limiting the display region to the exclusive screen of each system.

For instance, since the hospital has a large number of systems and the suppliers are scattered, each system is usually equipped with a separate display screen, such as call intercom, physical sign monitoring, infusion monitoring, electronic whiteboard, etc. Except for the electronic whiteboard, other display screens do not have operating functions. In addition, each terminal display screen only displays its own content. Thus, when there are multiple tasks to be processed on the same system, it often happens that many people wait in line behind the same terminal display screen for operation while other terminals are idle. As a result, each display terminal cannot be fully utilized, which not only causes a waste of resources, but also causes a low efficiency in collaboration among the medical staff.

In some related embodiments, the page on a certain display screen may be expanded to other display screens for display by connecting an expansion screen. However, the expansion screen generally connects the external display screen to the current display screen in a hard connecting fashion via a dedicated cable, such as a dedicated high-definition multimedia interface (HDMI) cable.

In the split-screen display method according to the exemplary embodiment of the present disclosure, at least one association display screen associated with the main operation display screen is determined, and pages to be displayed on the main operation display screen are transmitted to each association display screen for display over a network, such that any interface can be expanded to any split-screen without the hard connecting fashion when the comparison or auxiliary display is required, and multi-dimensional data information can be simultaneously displayed on a plurality of display screens to improve the efficiency of data display and the ability of information transmission, thereby preventing the display region of data from being limited by a single display screen. By displaying multi-dimensional data information simultaneously on a plurality of display screens, users do not need to turn pages frequently on the same display screen when viewing and using data, thereby improving the user's efficiency in the data processing process.

Taking the medical data as an example, if medical staff want to view the information and examination report of a patient separately while viewing all the patient information on the main operation display screen, they may transmit the patient's information to a neighboring association display screen for display and then transmit the patient's examination report to another association display screen for display. As a result, the multi-dimensional data information can be viewed simultaneously, there is no need to insert a connecting line between each display screen, and the subsequent operations of the medical staff on the main operation display screen are not influenced, thereby improving the work efficiency of the medical staff.

In this exemplary embodiment, at least one association display screen associated with the main operation display screen can be determined via the server terminal. Then, the target association display screen corresponding to the split-screen operation is determined from the association display screen and page parameters of the to-be-displayed page in the main operation display screen are acquired. Afterward, the page parameters of the to-be-displayed page are transmitted to the target association display screen. If the corresponding processor is installed on the main operation display screen, all the aforesaid processes may be completed via the processor in the main operation display screen. All the aforesaid processes herein include the overall process of determining at least one association display screen associated with the main operation display screen, determining the target association display screen corresponding to the split-screen operation from the association display screen and acquiring page parameters of the to-be-displayed page in the main operation display screen, and transmitting the page parameters of the to-be-displayed page to the target association display screen.

Hereinafter, the aforesaid steps of the exemplary embodiment are described in more detail in combination with FIG. 2 to FIG. 6.

In step S110, at least one association display screen associated with the main operation display screen is determined.

In this exemplary embodiment, the main operation display screen refers to a terminal display screen corresponding to the system currently operated by the user. The operation system herein may be, for example, an android system or a windows system, and the main operation display screen may be operated via a mouse, or an operable touch screen system may be configured for operation by direct touch. The association display screen may also be, for example, a terminal display screen under an android system or a windows system, and may be deployed with a related resident program. The resident program herein is a non-interface application program provided on the association display screen, which may always run, after being set, in the background of the system without affecting any function of the original system in the association display screen. For example, the resident program may automatically start following the system and register the corresponding display screen information into a server.

When the main operation display screen further serves as an association display screen corresponding to other main operation display screens, a related resident program shall also be deployed thereon.

Figure 2:
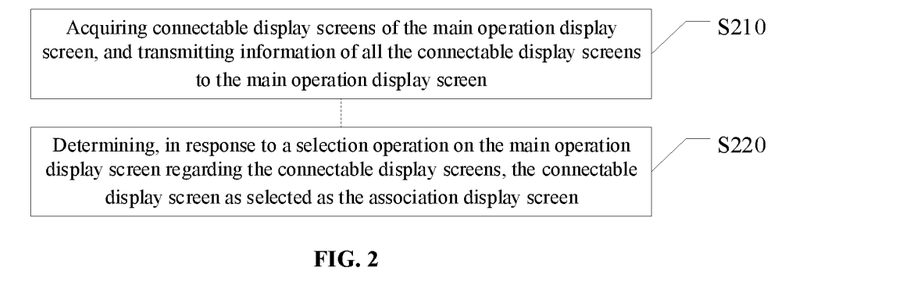
FIG. 2 shows a schematic flowchart for determining association display screens associated with a main operation display screen according to some embodiments of the present disclosure.

In this exemplary embodiment, as shown in FIG. 2, determining at least one association display screen associated with the main operation display screen includes the following steps.

In step S210, connectable display screens of the main operation display screen are acquired, and information of all the connectable display screens is transmitted to the main operation display screen.

The connectable display screen of the main operation display screen refers to other display screens that can be connected to the main operation display screen and receive data or messages transmitted by the main operation display screen. For example, the connectable display screen may be disposed adjacent to or in a same region with the main operation display screen to thereby enable the user to view at the same time.

In this exemplary embodiment, the server may acquire the connectable display screens of the main operation display screen according to the region where each display screen is disposed, and the method specifically includes: acquiring the region where the main operation display screen is disposed and the region where other display screens except the main operation display screen are disposed, and then taking the other display screens in a same region with the main operation display screen as the connectable display screens of the main operation display screen.

For example, in the hospital, the display screens in the same ward or the same office may be determined as the display screens in the same region, and other display screens in the same region with the main operation display screen may be taken as the connectable display screens of the main operation display screen.

In this exemplary embodiment, the server may further acquire the connectable display screens of the main operation display screen according to the distance between the main operation display screen and other display screens except the main operation display screen, and the method specifically includes: acquiring distances between the main operation display screen and other display screens, and taking the other display screens whose distance from the main operation display screen is not greater than a distance threshold as the connectable display screens of the main operation display screen.

If the main operation display screen is disposed in a rather large region or not in a specific religion, the display screens adjacent to or within a certain distance from the main operation display screen may be taken as the connectable display screens of the main operation display screen. For example, each display screen may be pre-set with corresponding position parameters, and the server determines the distance between the main operation display screen and other display screens by acquiring the position parameters of the main operation display screen and other display screens. For another example, Bluetooth and other wireless power-on technologies may be installed on each display, such that the main operation display screen may acquire the signal strength transmitted by other display screens via the Bluetooth and determine the distance between the main operation display screen and other display screens based on the signal strength as received. In addition, the distance between the main operation display screen and other display screens may also be determined by other methods, such as wireless fidelity (WIFI) positioning, etc., which is not specifically limited in this exemplary embodiment.

After acquiring the connectable display screens of the main operation display screen, the server transmits the information of all the connectable display screens to the main operation display screen. In an exemplary embodiment, the server may generate a list of the information of all the connectable display screens, and transmit the list to the main operation display screen for the user to view and select.

In step S220, in response to a selection operation on the main operation display screen regarding the connectable display screens, the connectable display screen as selected is determined as the association display screen.

After the server transmits the list of the information of all the connectable display screens to the main operation display screen, the user may select the connectable display screens in the list by clicking, checking and other operations, and determine the selected connectable display screen that meets the user's current needs as the association display screen.

For example, at least one connectable display screen may be selected and determined as the association display screen.

For example, it is also possible to not perform the step S220, and take all the connectable display screens as acquired in step S210 as the association display screens. In addition, some designated display screens may also be preset as association display screens connectable to the main operation display screen. For some specific display screens that are not in the same region or far away, they may be set as the connectable display screens of the main operation display screen.

In step S120, in response to the split-screen operation acting on the main operation display screen, the target association display screen corresponding to the split-screen operation is determined from the association display screen, and page parameters of the to-be-displayed page in the main operation display screen are acquired.

The target association display screen refers to an association display screen designated by the user through the split-screen operation to display the current to-be-displayed page. The split-screen operation may be achieved through multiple types of operations.

In response to the split-screen operation acting on the main operation display screen, the server determines the target association display screen corresponding to the split-screen operation from the association display screens. Simultaneously, the main operation display screen transmits the page parameters of the to-be-displayed page that needs to be displayed currently to the server in response to the split-screen operation.

If the system of the main operation display screen includes a processor, the processor in the main operation display screen may further be configured to perform the steps of determining the target association display screen from the association display screens and acquiring the page parameters of the to-be-displayed page in the main operation display screen.

Figure 3:
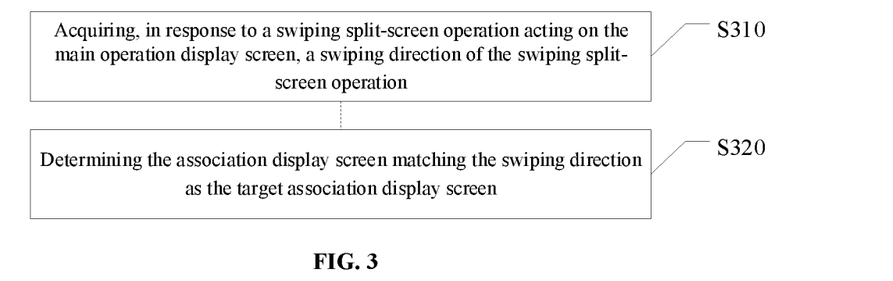
FIG. 3 shows a schematic flowchart for determining a target association display screen by a swiping split-screen operation according to some embodiments of the present disclosure.

In this exemplary embodiment, the target association display screen corresponding to the split-screen operation may be determined from the association display screens by a swiping split-screen operation. As shown in FIG. 3, determining, in response to the split-screen operation acting on the main operation display screen, the target association display screen corresponding to the split-screen operation from the association display screens may include the following steps.

In step S310, a swiping direction of the swiping split-screen operation is acquired in response to the swiping split-screen operation acting on the main operation display screen.

In step S320, the association display screen matching the swiping direction is determined as the target association display screen.

Taking the touch display screen as an example, the user may determine the target association display screen by swiping operations on the main operation display screen.

For example, if the user swipes to the left on the main operation display screen, the server may determine the association display screen whose position parameter is disposed on the left side of the main operation display screen as the target association display screen by acquiring the preset position parameters of each display screen, or acquire the signal direction of other association display screens on the main operation display screen via Bluetooth and determine the association display screen whose signal direction is on the left side of the main operation display screen as the target association display screen. If the user swipes to the right, the server may determine the association display screen on the right of the main operation display screen as the target association display screen with the same method.

When there is a plurality of association display screens on one side of the main operation display screen, all association display screens on that side may be determined as the target association display screen, or one of them is selected randomly as the target association display screen, or one of them is configured as the target association display screen through preset settings. For example, the association display screen most frequently used by the user may be counted based on the user's past behavior habits and then taken as the target association display screen.

In this exemplary embodiment, the target association display screen corresponding to the split-screen operation may also be determined from the association display screens by popping up a screen selection interface. The specific method includes, popping up, in response to the split-screen operation acting on the main operation display screen, a screen selection interface on the main operation display screen; and determining, in response to a screen selection operation acting on the screen selection interface, the association display screen corresponding to the screen selection operation as the target association display screen.

For example, the user may right-click, long-press, click on the interface pop-up control, or perform other types of operations to allow the screen selection interface to be popped up on the main operation display screen. The screen selection interface may include a list of all the association display screens to be selected. By clicking the control corresponding to a certain association display screen in the list, the server may determine the association display screen as the target association display screen.

Figure 4:
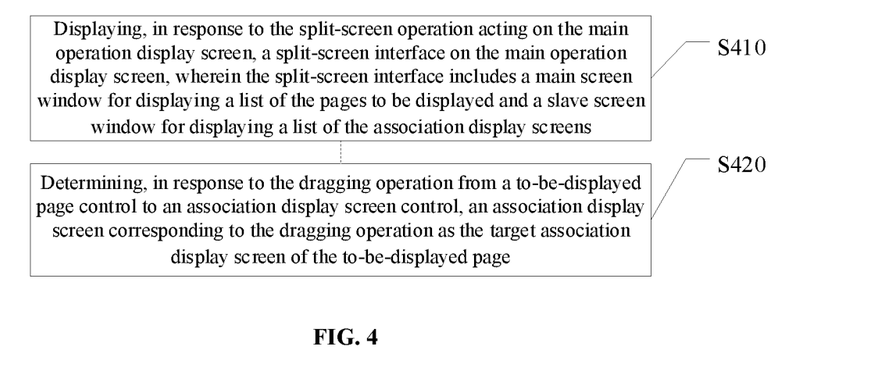
FIG. 4 shows a schematic flowchart for determining a target association display screen by a split-screen interface according to some embodiments of the present disclosure.

In this exemplary embodiment, the target association display screen corresponding to the split-screen operation may also be determined from the association display screens via the split-screen interface. As shown in FIG. 4, determining, in response to the split-screen operation acting on the main operation display screen, the target association display screen corresponding to the split-screen operation from the association display screens may include the following steps.

In step S410, in response to the split-screen operation acting on the main operation display screen, a split-screen interface is displayed on the main operation display screen. The split-screen interface herein includes a main screen window for displaying a list of the pages to be displayed and a slave screen window for displaying a list of the association display screens.

In response to the split-screen operation on the main operation display screen, the user may, for example, right-click, long-press, click the interface pop-up control or perform other types of operations to allow the screen selection interface to be popped up on the main operation display screen.

Figure 5:
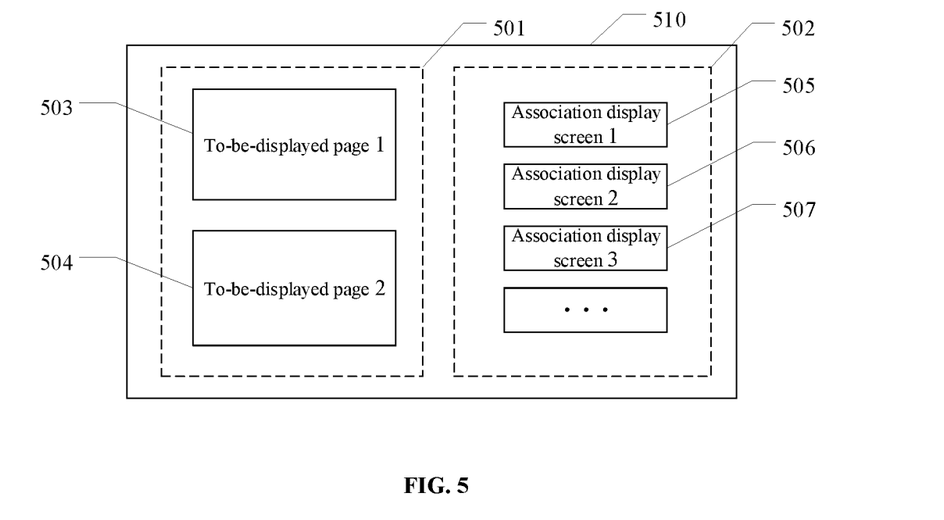
FIG. 5 shows a schematic diagram of a split-screen interface for a split-screen display method according to some embodiments of the present disclosure.

FIG. 5 shows a schematic diagram of a split-screen interface according to some embodiments of the present disclosure. The main operation display screen is currently displayed as a split-screen interface 510, and the split-screen interface 510 includes a main screen window 501 and a slave screen window 502. The main screen window 501 displays a list of controls of the to-be-displayed page on the main operation display screen, including a control 503 of a to-be-displayed page 1 and a control 504 of a to-be-displayed page 2. A list of the association display screen controls is displayed in the slave screen window 502, including a control 505 of an association display screen 1, a control 506 of an association display screen 2, a control 507 of an association display screen 3, and the like.

In step S420, in response to the dragging operation from a to-be-displayed page control to an association display screen control, the association display screen corresponding to the dragging operation is determined as the target association display screen of the to-be-displayed page.

The to-be-displayed page control herein is a control of the to-be-displayed page in the list of pages to be displayed, and the association display screen control is a control of the association display screen in the list of association display screens.

In response to the dragging operation from the to-be-displayed page control in the list of pages to be displayed to the association display screen control in the list of association display screens, the association display screen corresponding to the dragging operation may be determined as the target association display screen of the to-be-displayed page. For example, if the user drags the control 503 of the to-be-displayed page 1 to the position where the control 505 of the association display screen 1 is disposed, the server determines the association display screen 1 as the target association display screen corresponding to the to-be-displayed page 1.

In this exemplary embodiment, since the main operation display screen includes a touch display screen, the aforesaid methods for determining the target association display screen may all be completed by a touch operation.

In step S130, the page parameters of the to-be-displayed page are transmitted to the target association display screen to enable the target association display screen to display contents of the to-be-displayed page based on the page parameters.

In this exemplary embodiment, besides the data information displayed in the to-be-displayed page, the page parameters of the to-be-displayed page may further include information such as the display size of the to-be-displayed page while being displayed on the main operation display screen. The display size may include the display interface ratio, such as 16:9, or 4:3, etc., and the information regarding whether the display is horizontal or vertical. The display interface ratio may be a ratio between the horizontal length and the vertical height of the display screen.

Since the display sizes of the main operation display screen and the target association display screen may be different, the page parameters of the to-be-displayed page shall be adjusted firstly, and then transmitted to the target association display screen for displaying the pages. The method includes: acquiring display screen information of the target association display screen, and then obtaining a target page parameter based on the page parameters of the to-be-displayed page and the display screen information of the target association display screen; and transmitting the target page parameter to the target association display screen to enable the target association display screen to display contents of the to-be-displayed page based on the target page parameter.

The display screen information of the target association display screen includes display size information of the target association display screen.

Figure 6:
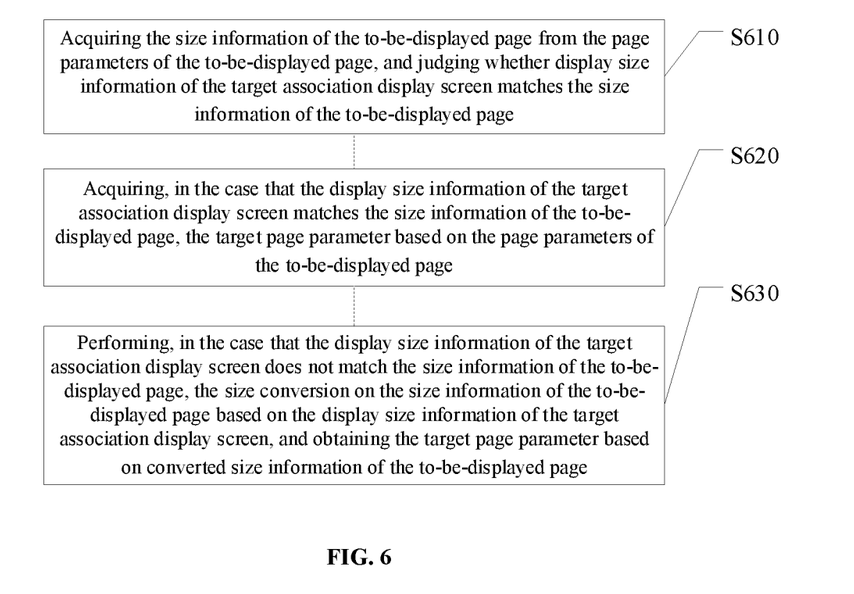
FIG. 6 shows a schematic flowchart for calculating a target page parameter according to some embodiments of the present disclosure.

In this exemplary embodiment, as shown in FIG. 6, obtaining the target page parameter based on the page parameters of the to-be-displayed page and the display screen information of the target association display screen includes the following steps.

In step S610, the size information of the to-be-displayed page is acquired from the page parameters of the to-be-displayed page, and whether display size information of the target association display screen matches the size information of the to-be-displayed page is judged.

Judging whether the display size information of the target association display screen matches the size information of the to-be-displayed page may be implemented by judging whether the target association display screen and the main operation display screen have a same display interface ratio or whether they are both horizontal display screens or vertical display screens.

For example, if the target association display screen and the main operation display screen have a same display interface ratio and are both horizontal or vertical display screens, it is determined that the display size information of the target association display screen matches the size information of the to-be-displayed page. If the target association display screen and the main operation display screen do not have a same display interface ratio or are not both horizontal or vertical display screens, it is determined that the display size information of the target association display screen does not match the size information of the to-be-displayed page.

In step S620, in a case that the display size information of the target association display screen matches the size information of the to-be-displayed page, the target page parameter is acquired based on the page parameters of the to-be-displayed page.

In the case that the display size information of the target association display screen matches the size information of the to-be-displayed page, it indicates that the display size of the to-be-displayed page when displayed on the main operation display screen matches the display size of the target association display screen. For example, if the display interface ratios thereof are both 16:9, the target page parameter may be directly acquired without converting the size information in the page parameters of the to-be-displayed page.

In step S630, in a case that the display size information of the target association display screen does not match the size information of the to-be-displayed page, the size conversion is performed on the size information of the to-be-displayed page based on the display size information of the target association display screen, and the target page parameter is acquired based on converted size information of the to-be-displayed page.

The display size information of the target association display does not match the size information of the to-be-displayed page, which may for example include the following cases where the display interface ratio of the to-be-displayed page on the main operation display screen is 16:9, whereas the display interface ratio of the target association display screen is 4:3, or the main operation display screen is a horizontal screen, whereas the target association display screen is a vertical screen. In the cases, the size conversion shall be performed firstly to thereby acquire the target page parameters based on the converted size information of the to-be-displayed page. Otherwise, the page displayed on the target association display screen may be compressed or elongated, which may cause some confusion to the user.

During the size converting process for the to-be-displayed page, the content to be displayed in the to-be-displayed page may be adjusted after converting the size information of the to-be-displayed page into the display size information of the target association display screen. For example, if the content of the to-be-displayed page includes images and text, the resolution and size of the image may be adjusted to an appropriate size, and for the text portion, the maximum number of words as displayed in each line of the text may be adjusted, or values of the font size, line spacing, etc. may be adjusted, such that the content of the to-be-displayed page can be displayed normally on the target association display screen at an appropriate ratio.

After acquiring the target page parameter of the to-be-displayed page, the server may transmit the target page parameter to the resident program corresponding to the target association display screen, and the resident program displays the content of the to-be-displayed page based on the target page parameter as acquired.

In this exemplary embodiment, when the target page parameter is transmitted to the target association display screen, a screen identification number of the target association display screen may be acquired from the display screen information of the target association display screen, and then the target page parameter is transmitted to the target association display screen based on the screen identification number.

In an exemplary embodiment, the screen identification number may include a display screen number, an Internet Protocol (IP) address or other screen identification numbers which may be used to distinguish respective display screens, and the information may be transmitted to a designated target association display screen according to the screen identification number.

In this exemplary embodiment, the page parameters of the to-be-displayed page may further include page display time of the to-be-displayed page, and the target page parameter may include the page display time of the to-be-displayed page. After the content of the to-be-displayed page is displayed based on the target page parameter as received by the target association display screen, the page display time of the to-be-displayed page may further be acquired from the target page parameter to enable the target association display screen to display the content of the to-be-displayed page based on the page display time.

The target association display screen may also include a timing shutdown function. When the display time of the to-be-displayed page in the target association display screen exceeds the specified page display time, the target association display screen may automatically exit the to-be-displayed page. In addition, the user may further manually exit the to-be-displayed page according to actual needs; or when the target association display screen receives the page closing message, the to-be-displayed page may be directly exited.

In this exemplary embodiment, when the page display time of the to-be-displayed page on the target association display screen has expired, the page content as displayed on the target association display screen is reverted to an original page before the display of the to-be-displayed page.

When the page display time of the to-be-displayed page on the target association display screen is over, or the user manually transmits the exit message of the to-be-displayed page, the target association display screen exits the to-be-displayed page and reverts the content as displayed to the original page as displayed previously, which thereby causes no impact on the use of the target association display screen per se.

Figure 7:
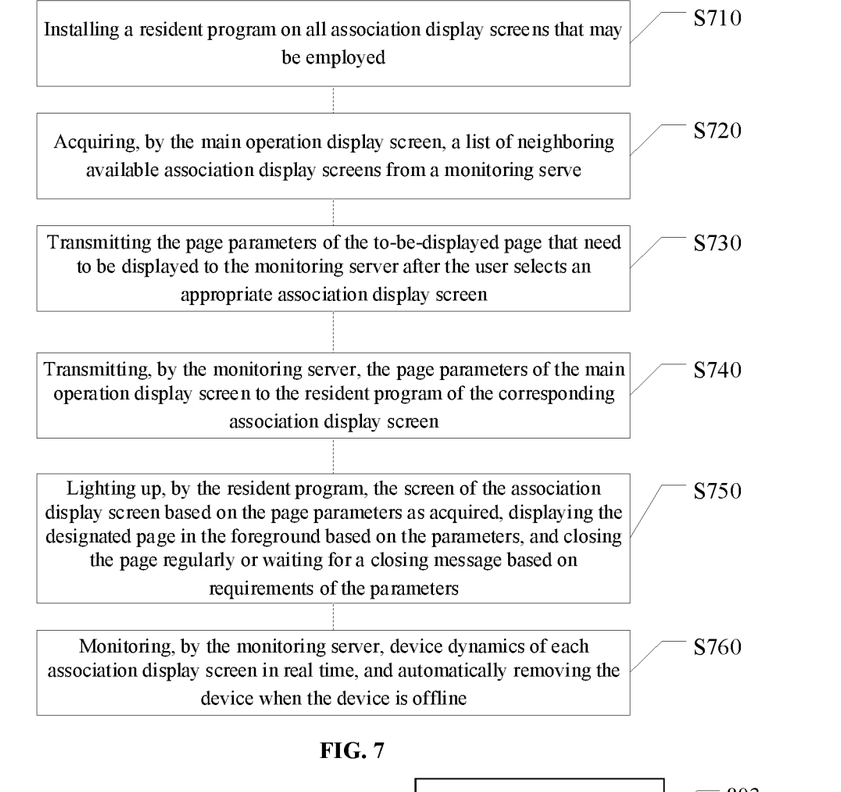
FIG. 7 shows a schematic flowchart of a split-screen display method according to some embodiments of the present disclosure.
Figure 8:
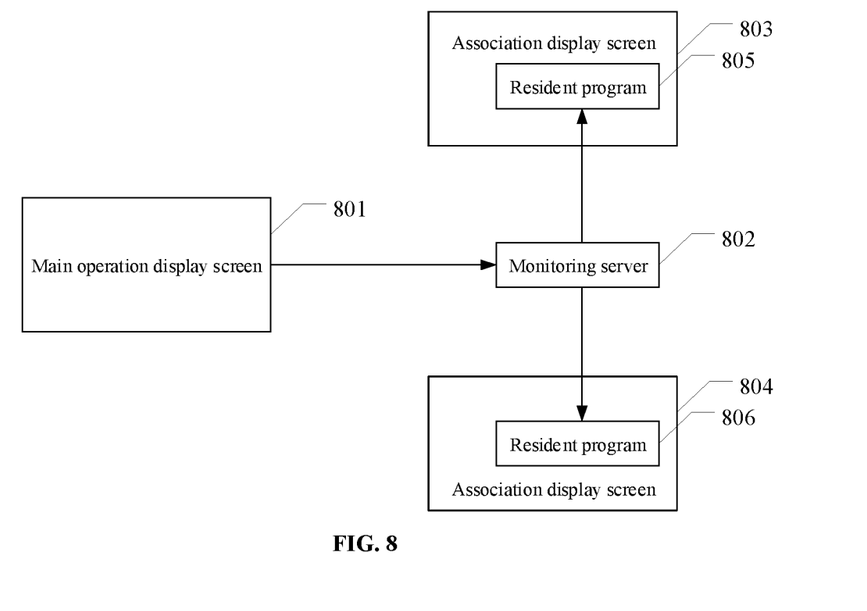
FIG. 8 shows a system architecture diagram of a split-screen display method according to some embodiments of the present disclosure.

FIG. 7 shows a complete flowchart according to some embodiments of the present disclosure, and in FIG. 8 shows a system architecture diagram corresponding to FIG. 7. FIGS. 7 and 8 are examples of the steps in this exemplary embodiment, and the flowchart is implemented by following steps.

In step S710, a resident program is installed on all association display screens that may be employed.

In step S720, the main operation display screen acquires a list of neighboring available association display screens from a monitoring server.

The system architecture diagram of FIG. 8 schematically shows the main operation display screen 801 and the monitoring server 802, and the relationship between the available association display screens 803 and 804. In practical applications, the number of selectable association display screens is not limited, and this exemplary embodiment is only an example for illustration.

In step S730, after the user selects an appropriate association display screen, the page parameters of the to-be-displayed page that need to be displayed are transmitted to the monitoring server.

In step S740, the monitoring server transmits the page parameters of the main operation display screen to the resident program of the corresponding association display screen.

For example, if the target association display screen selected by the user is the association display screen 803, the monitoring server 802 may transmit the page parameters of the to-be-displayed page on the main operation display screen 801 to the resident program 805 of the association display screen 803. If the target association display screen selected by the user is the association display screen 804, the monitoring server 802 may transmit the page parameters of the to-be-displayed page on the main operation display screen 801 to the resident program 806 of the association display screen 804.

In step S750, the resident program lights up the screen of the association display screen based on the page parameters as acquired, displays the designated page in the foreground based on the parameters, and closes the page regularly or waits for a closing message based on requirements of the parameters.

The resident program transmits the page parameters to the corresponding target association display screen based on the page parameters of the to-be-displayed page as acquired, and closes the page regularly based on settings of the time parameter or waits for the page closing message transmitted by the user.

In step S760, the monitoring server monitors device dynamics of each association display screen in real time, and automatically removes the device when the device is offline.

The association display screen may be automatically removed from the list of association display screens when it is offline.

It should be noted that although respective steps of the method of the present disclosure are described in a specific order in embodiments and accompanying drawings, it does not require or imply that the steps must be performed in the specific order, or that the desired result can only be achieved if all the steps as shown are performed. Additionally or alternatively, some steps may be omitted, multiple steps may be combined into one step for execution, and/or one step may be decomposed into multiple steps for execution.

Figure 9:
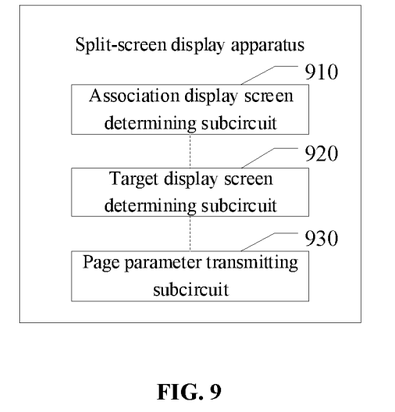
FIG. 9 shows a block diagram of a split-screen display apparatus according to some embodiments of the present disclosure.

Furthermore, the present disclosure further provides a split-screen display apparatus. As shown in FIG. 9, the split-screen display apparatus may include an association display screen determining subcircuit 910, a target display screen determining subcircuit 920, and a page parameter transmitting subcircuit 930.

The association display screen determining subcircuit 910 may be configured to determine at least one association display screen associated with a main operation display screen.

The target display screen determining subcircuit 920 may be configured to determine, in response to a split-screen operation acting on the main operation display screen, a target association display screen corresponding to the split-screen operation from the association display screen and acquire page parameters of a to-be-displayed page in the main operation display screen.

The page parameter transmitting subcircuit 930 may be configured to transmit the page parameters of the to-be-displayed page to the target association display screen.

In some exemplary embodiments of the present disclosure, the association display screen determining subcircuit 910 may include a connectable display screen acquiring subcircuit and an association display screen selection subcircuit.

The connectable display screen acquiring subcircuit may be configured to acquire connectable display screens of the main operation display screen, and transmit information of all the connectable display screens to the main operation display screen.

The association display screen selection subcircuit may be configured to determine, in response to a selection operation on the main operation display screen regarding the connectable display screens, the connectable display screen as selected as the association display screen.

In some exemplary embodiments of the present disclosure, the connectable display screen acquiring subcircuit may include a display screen region acquiring subcircuit and a connectable display screen determining subcircuit.

The display screen region acquiring subcircuit may be configured to acquire a region where the main operation display screen is disposed and a region where other display screens, except the main operation display screen, are disposed.

The connectable display screen determining subcircuit is configured to take the other display screens in a same region with the main operation display screen as the connectable display screens of the main operation display screen.

In some exemplary embodiments of the present disclosure, the connectable display screen acquiring subcircuit may include a display screen distance acquiring subcircuit and a connectable display screen determining subcircuit.

The display screen distance acquiring subcircuit may be configured to acquire the distance between the main operation display screen and other display screens.

The connectable display screen determining subcircuit is configured to take the other display screens whose distance from the main operation display screen is not greater than a distance threshold as the connectable display screens of the main operation display screen.

In some exemplary embodiments of the present disclosure, the target display screen determining subcircuit 920 may include a swiping direction acquiring subcircuit and a swiping direction matching subcircuit.

The swiping direction acquiring subcircuit may be configured to acquire, in response to a swiping split-screen operation acting on the main operation display screen, a swiping direction of the swiping split-screen operation.

The swiping direction matching subcircuit may be configured to determine the association display screen matching the swiping direction as the target association display screen.

In some exemplary embodiments of the present disclosure, the target display screen determining subcircuit 920 may include a screen selection interface popping-up subcircuit and a screen selection subcircuit.

The screen selection interface popping-up subcircuit may be configured to pop up, in response to the split-screen operation acting on the main operation display screen, a screen selection interface on the main operation display screen.

The screen selection subcircuit may be configured to determine, in response to a screen selection operation acting on the screen selection interface, the association display screen corresponding to the screen selection operation as the target association display screen.

In some exemplary embodiments of the present disclosure, the target display screen determining subcircuit 920 may further include a split-screen interface displaying subcircuit and a dragging operation determining subcircuit.

The split-screen interface displaying subcircuit may be configured to display, in response to the split-screen operation acting on the main operation display screen, a split-screen interface on the main operation display screen. The split-screen interface herein includes a main screen window for displaying a list of the pages to be displayed and a slave screen window for displaying a list of the association display screens.

The dragging operation determining subcircuit may be configured to determine, in response to a dragging operation from a to-be-displayed page control to an association display screen control, the association display screen corresponding to the dragging operation as the target association display screen of the to-be-displayed page. The to-be-displayed page control is a control of the to-be-displayed page in the list of pages to be displayed, and the association display screen control is a control of the association display screen in the list of association display screens.

In some exemplary embodiments of the present disclosure, the page parameter transmitting subcircuit 930 may include a page parameter converting subcircuit and a page parameter transmitting subcircuit.

The page parameter converting subcircuit may be configured to acquire display screen information of the target association display screen, and obtain a target page parameter based on the page parameters of the to-be-displayed page and the display screen information of the target association display screen.

The page parameter transmitting subcircuit may be configured to transmit the target page parameter to the target association display screen to enable the target association display screen to display contents of the to-be-displayed page based on the target page parameter.

In some exemplary embodiments of the present disclosure, the page parameter transmitting subcircuit may include a size information acquiring subcircuit, a first page parameter determining subcircuit, and a second page parameter determining subcircuit.

The size information acquiring subcircuit may be configured to acquire the size information of the to-be-displayed page from the page parameters of the to-be-displayed page, and judge whether display size information of the target association display screen matches the size information of the to-be-displayed page.

The first page parameter determining subcircuit may be configured to acquire the target page parameter based on the page parameters of the to-be-displayed page if the display size information of the target association display screen matches the size information of the to-be-displayed page.

The second page parameter determining subcircuit may be configured to perform, if the display size information of the target association display screen does not match the size information of the to-be-displayed page, the size conversion on the size information of the to-be-displayed page based on the display size information of the target association display screen, and obtain the target page parameter based on converted size information of the to-be-displayed page.

In some exemplary embodiments of the present disclosure, the page parameter transmitting subcircuit 930 may include a screen identification number acquiring subcircuit and a page parameter transmitting subcircuit.

The screen identification number acquiring subcircuit may be configured to acquire a screen identification number of the target association display screen from display screen information of the target association display screen.

The page parameter transmitting subcircuit may be configured to transmit the page parameters of the to-be-displayed page to the target association display screen based on the screen identification number.

In some exemplary embodiments of the present disclosure, a split-screen display apparatus provided in the present disclosure may further include a display time determining subcircuit, which may be configured to acquire a page display time of the to-be-displayed page from page parameters and enable the target association display to display contents of the to-be-displayed page based on the page display time.

In some exemplary embodiments of the present disclosure, the split-screen display apparatus provided by the present disclosure may further include a display page reverting subcircuit configured to revert, when the page display time of the to-be-displayed page on the target association display has expired, page content as displayed on the target association display screen to an original page before the display of the to-be-displayed page.

The present disclosure further provides a split-screen display apparatus that may include a to-be-displayed page displaying subcircuit that may be configured to acquire page parameters of the to-be-displayed page and display contents of the to-be-displayed page based on the page parameters as received.

The present disclosure further provides a split-screen display apparatus, which may include a page parameter transmitting subcircuit and a to-be-displayed page displaying subcircuit.

The page parameter transmitting subcircuit may be configured to transmit the page parameters of the to-be-displayed page to the target association display screen by the aforesaid method.

The to-be-displayed page displaying subcircuit may be configured to display contents of the to-be-displayed page via a target association display screen based on the page parameters.

The details of each subcircuit in the split-screen display apparatus have been described in detail in the corresponding method embodiments and will not be repeated here.

Figure 10:
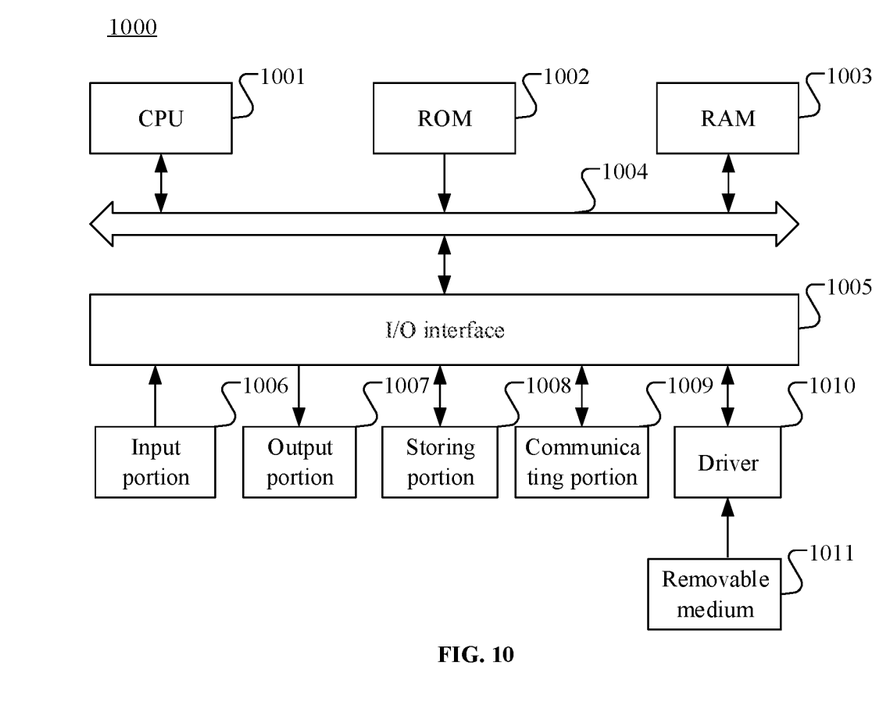
FIG. 10 shows a schematic structural diagram of a computer system suitable for implementing an electronic device according to some embodiments of the present disclosure.

FIG. 10 shows a schematic structural diagram of a computer system suitable for implementing an electronic device according to an embodiment of the present disclosure.

It should be noted that the computer system 1000 of the electronic device shown in FIG. 10 is only an example and should not impose any limitation on the functionality and application scope of embodiments of the present disclosure.

As shown in FIG. 10, the computer system 1000 includes a central processing unit (CPU) 1001 that may perform various appropriate actions and processes based on a program stored in a read-only memory (ROM) 1002 or a program loaded into a random access memory (RAM) 1003 from a storing portion 1008. The RAM 1003 further stores various programs and data required for the system operation. The CPU 1001, ROM 1002, and RAM 1003 are connected to each other via a bus 1004. An input/output (I/O) interface 1005 is also connected to the bus 1004.

The I/O interface 1005 is connected with the following components: an input portion 1006 including a keyboard, a mouse, etc.; an output portion 1007 including such as a cathode ray tube (CRT), a liquid crystal display (LCD), etc. and a speaker, etc.; a storing portion 1008 including a hard disk, etc.; and a communicating portion 1009 including a network interface card such as an LAN card, a modem, etc. The communicating portion 1009 performs communication processing via a network such as the Internet. A driver 1010 is also connected to the I/O interface 1005 as needed. A removable medium 1011, such as a disk, an optical disk, a magnetic disk, a semiconductor memory, etc., is mounted on the drive 1010 as needed, such that the computer programs as read from the removable medium 1011 may be mounted into the storing portion 1008 as needed.

In particular, according to embodiments of the present disclosure, the process described below with reference to the flowchart may be implemented as a computer software program. For example, embodiments of the present disclosure include a computer program product including a computer program carried on a computer-readable medium, and the computer program includes a program code for performing the method shown in the flowchart. In such an embodiment, the computer program may be downloaded and installed from the network via the communicating portion 1009, and/or from the removable medium 1011. The computer program, when executed by the CPU 1001, performs various functions as defined in the system of the present disclosure.

It should be noted that the computer-readable medium shown in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus or equipment, or any combination thereof. Examples of the computer-readable storage medium may include, but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storing equipment, a magnetic storing equipment, or any suitable combination thereof. In the present disclosure, the computer-readable storage medium may be any tangible medium that includes or stores a program, and the program may be adopted by or in combination with an instruction executing system, apparatus or equipment. In addition, in the present disclosure, the computer-readable signal medium may include a data signal propagated in a baseband or as part of a carrier wave that carries a computer-readable program code. The data signals as propagated may take a variety of forms, including but not limited to electromagnetic signals, optical signals, or any suitable combination thereof. The computer-readable signal medium may also be any computer-readable medium that sends, propagates, or transmits the program as adopted by or in combination with the instruction executing system, apparatus or equipment. The program code included on the computer-readable medium may be transmitted via any suitable medium, including but not limited to wireless, wire, fiber optic cable. RF, etc., or any suitable combination thereof.

The flowcharts and block diagrams in the accompanying drawings illustrate the architecture, functionality, and operation as possibly achieved by the system, method, and computer program product according to various embodiments of the present disclosure. At this point, each block in the flowchart or block diagram may represent a module, program segment, or portion of code, and the module, program segment, or portion of code includes at least one executable instruction for implementing a prescribed logical function. It shall also be noted that, in some embodiments as replacements, the functions indicated in the blocks may also occur in an order different from the order indicated in the accompanying drawings. For example, two blocks represented one after the other may actually be executed in substantially parallel, and they may sometimes be executed in the opposite order depending on the function as involved. It shall be noted that each block in the block diagram or flowchart and the combination of blocks in the block diagram or flowchart may be implemented with a dedicated hardware-based system that performs the specified function or operation, or may be implemented with a combination of dedicated hardware and computer instructions.

As another aspect, the present disclosure further provides a computer-readable medium which may be included in the electronic device described in the aforesaid embodiments, or may be present alone and not assembled into the electronic device. The computer-readable medium carries one or more programs that, when executed by the electronic device, actuates the electronic device to implement the method as described in the following embodiments.

It shall be noted that although several modules of the device for executing actions are mentioned in the detailed description, this division is not mandatory. In fact, according to embodiments of the present disclosure, the features and functions of two or more modules described above may be implemented in a single module. Conversely, the features and functions of a module described above may be further divided and implemented by a plurality of modules.

Other embodiments of the present disclosure will be apparent to those skilled in the art from consideration of the specification and practice of the present disclosure. The present disclosure is intended to cover any variations, uses, or adaptations of the present disclosure following the general principles thereof and including common knowledge or commonly used technical measures which are not disclosed herein.

It will be appreciated that the present disclosure is not limited to the exact construction that has been described above and illustrated in the accompanying drawings, and that various modifications and changes can be made without departing from the scope thereof. The scope of the present disclosure is only limited by the appended claims.

What is claimed is:

1. A split-screen display method, comprising:
   determining at least one association display screen associated with a main operation display screen;
   determining, in response to a split-screen operation acting on the main operation display screen, a target association display screen corresponding to the split-screen operation from the association display screen, wherein the split-screen operation comprises at least one of a swiping split-screen operation, triggering pop-up of a screen selection interface, and triggering pop-up of a split-screen interface, and the target association display screen is the association display screen designated by a user through the split-screen operation to display a current to-be-displayed page;
   acquiring page parameters of a to-be-displayed page in the main operation display screen, wherein the page parameters comprise a page display time of the to-be-displayed page, and the target association display screen has a timing shutdown function;
   transmitting the page parameters of the to-be-displayed page to the target association display screen;
   acquiring the page display time of the to-be-displayed page from the page parameters of the to-be-displayed page to enable the target association display screen to display contents of the to-be-displayed page based on the page display time; and
   controlling, when the page display time of the to-be-displayed page on the target association display screen expires, or when the timing shutdown function is turned on and the page display time of the to-be-displayed page on the target association display screen exceeds a specified page display time, or when receiving an exit message of the to-be-displayed page transmitted manually by the user, the target association display screen to exit the to-be-displayed page and to revert to an original page displayed before the to-be-displayed page.

2. The split-screen display method according to claim 1, wherein determining at least one association display screen associated with the main operation display screen comprises:
   acquiring connectable display screens to the main operation display screen, and transmitting information of all the connectable display screens to the main operation display screen; and
   determining, in response to a selection operation on the main operation display screen regarding the connectable display screens, the connectable display screen as selected as the association display screen.

3. The split-screen display method according to claim 2, wherein acquiring the connectable display screens to the main operation display screen comprises:
   acquiring a region where the main operation display screen is disposed and a region where other display screens, except the main operation display screen, are disposed; and
   taking the other display screens in a same region with the main operation display screen as the connectable display screens to the main operation display screen.

4. The split-screen display method according to claim 2, wherein acquiring the connectable display screens to the main operation display screen comprises:
   acquiring distances between the main operation display screen and other display screens except the main operation display screen; and
   taking the other display screens whose distance from the main operation display screen is not greater than a distance threshold as the connectable display screens to the main operation display screen.

5. The split-screen display method according to claim 1, wherein the split-screen operation comprises the swiping split-screen operation, determining, in response to the split-screen operation acting on the main operation display screen, the target association display screen corresponding to the split-screen operation from the association display screen comprises:
    acquiring, in response to the swiping split-screen operation acting on the main operation display screen, a swiping direction of the swiping split-screen operation; and
    determining the association display screen matching the swiping direction as the target association display screen.

6. The split-screen display method according to claim 1, wherein determining, in response to the split-screen operation acting on the main operation display screen, the target association display screen corresponding to the split-screen operation from the association display screen comprises:
    popping up, in response to the split-screen operation acting on the main operation display screen, the screen selection interface on the main operation display screen; and
    determining, in response to a screen selection operation acting on the screen selection interface, the association display screen corresponding to the screen selection operation as the target association display screen.

7. The split-screen display method according to claim 1, wherein determining, in response to the split-screen operation acting on the main operation display screen, the target association display screen corresponding to the split-screen operation from the association display screen comprises:
    displaying, in response to the split-screen operation acting on the main operation display screen, the split-screen interface on the main operation display screen, wherein the split-screen interface comprises a main screen window for displaying a list of pages to be displayed and a slave screen window for displaying a list of the association display screens; and
    determining, in response to a dragging operation from a to-be-displayed page control to an association display screen control, an association display screen corresponding to the dragging operation as the target association display screen of the to-be-displayed page, wherein the to-be-displayed page control is a control of the to-be-displayed page in the list of pages to be displayed, and the association display screen control is a control of the association display screen in the list of association display screens.

8. The split-screen display method according to claim 1, wherein the page parameters of the to-be-displayed page comprise data information displayed in the to-be-displayed page and size information of the to-be-displayed page.

9. The split-screen display method according to claim 1, wherein transmitting the page parameters of the to-be-displayed page to the target association display screen comprises:
    acquiring display screen information of the target association display screen, and obtaining a target page parameter based on the page parameters of the to-be-displayed page and the display screen information of the target association display screen; and
    transmitting the target page parameter to the target association display screen to enable the target association display screen to display contents of the to-be-displayed page based on the target page parameter.

10. The split-screen display method according to claim 9, wherein the display screen information of the target association display screen comprises display size information of the target association display screen; and obtaining the target page parameter based on the page parameters of the to-be-displayed page and the display screen information of the target association display screen comprises:
    acquiring size information of the to-be-displayed page from the page parameters of the to-be-displayed page;
    acquiring, in response to a match between the display size information of the target association display screen and the size information of the to-be-displayed page, the target page parameter based on the page parameters of the to-be-displayed page; and
    performing, in response to a mismatch between the display size information of the target association display screen and the size information of the to-be-displayed page, size conversion on the size information of the to-be-displayed page based on the display size information of the target association display screen, and obtaining the target page parameter based on converted size information of the to-be-displayed page.

11. The split-screen display method according to claim 1, wherein transmitting the page parameters of the to-be-displayed page to the target association display screen comprises:
    acquiring a screen identification number of the target association display screen from display screen information of the target association display screen; and
    transmitting the page parameters of the to-be-displayed page to the target association display screen based on the screen identification number.

12. The split-screen display method according to claim 1, wherein the main operation display screen comprises a touch display screen.

13. An electronic device, comprising:
    a processor; and
    a memory for storing at least one program,
    wherein the processor, when running the at least one program, is caused to perform the split-screen display method as defined in claim 1.

14. A non-transitory computer-readable medium storing computer programs therein, wherein the computer programs, when run by a processor, cause the processor to perform the split-screen display method as defined in claim 1.

15. A split-screen display method, applicable to a target association display screen, wherein the target association display screen has a timing shutdown function, the method comprising:
    acquiring page parameters of a to-be-displayed page, wherein the page parameters comprise a page display time of the to-be-displayed page;
    acquiring the page display time of the to-be-displayed page from the page parameters of the to-be-displayed page, and displaying contents of the to-be-displayed page based on the page display time; and
    controlling, when the page display time of the to-be-displayed page on the target association display screen has expired, or when the timing shutdown function is turned on and the page display time of the to-be-displayed page in the target association display screen exceeds a specified page display time, or when receiving an exit message of the to-be-displayed page transmitted manually by the user, the target association display screen to exit the to-be-displayed page and to revert to an original page displayed before the to-be-displayed page.

16. A split-screen display method, comprising:
    determining at least one association display screen associated with a main operation display screen;

determining, in response to a split-screen operation acting on the main operation display screen, a target association display screen corresponding to the split-screen operation from the association display screen, wherein the split-screen operation comprises at least one of a swiping split-screen operation, triggering pop-up of a screen selection interface, and triggering pop-up of a split-screen interface, and the target association display screen is the association display screen designated by a user through the split-screen operation to display a current to-be-displayed page;

acquiring page parameters of a to-be-displayed page in the main operation display screen, wherein the page parameters comprise a page display time of the to-be-displayed page, and the target association display screen has a timing shutdown function;

transmitting the page parameters of the to-be-displayed page to the target association display screen;

acquiring the page display time of the to-be-displayed page from the page parameters of the to-be-displayed page to enable the target association display screen to display contents of the to-be-displayed page based on the page display time;

controlling, when the page display time of the to-be-displayed page on the target association display screen expires, or when the timing shutdown function is turned on and the page display time of the to-be-displayed page on the target association display screen exceeds a specified page display time, or when receiving a exit message of the to-be-displayed page transmitted manually by the user, the target association display screen to exit the to-be-displayed page and to revert to an original page displayed before the to-be-displayed page; and displaying, via the target association display screen, contents of the to-be-displayed page based on the page parameters.

17. The split-screen display method according to claim 16, wherein determining at least one association display screen associated with the main operation display screen comprises:

acquiring connectable display screens to the main operation display screen, and transmitting information of all the connectable display screens to the main operation display screen; and determining, in response to a selection operation on the main operation display screen regarding the connectable display screens, the connectable display screen as selected as the association display screen.

18. The split-screen display method according to claim 17, wherein acquiring the connectable display screens to the main operation display screen comprises:

acquiring a region where the main operation display screen is disposed and a region where other display screens, except the main operation display screen, are disposed; and taking the other display screens in a same region with the main operation display screen as the connectable display screens to the main operation display screen.

* * * * *